US007797492B2

(12) United States Patent
Mukker et al.

(10) Patent No.: US 7,797,492 B2
(45) Date of Patent: Sep. 14, 2010

(54) METHOD AND APPARATUS FOR DEDICATING CACHE ENTRIES TO CERTAIN STREAMS FOR PERFORMANCE OPTIMIZATION

(76) Inventors: Anoop Mukker, 1733 Langholm Way, Folsom, CA (US) 95630; Zohar Bogin, 171 Wellfleet Cir., Folsom, CA (US) 95630; Tuong Trieu, 207 Westbury Cir., Folsom, CA (US) 95630; Aditya Navale, 4215 Flushing Pl., El Dorado Hills, CA (US) 95762

( * ) Notice: Subject to any disclaimer, the term of this patent is extended or adjusted under 35 U.S.C. 154(b) by 162 days.

(21) Appl. No.: 10/783,621

(22) Filed: Feb. 20, 2004

(65) Prior Publication Data
US 2005/0188156 A1    Aug. 25, 2005

(51) Int. Cl.
G06F 13/16        (2006.01)
(52) U.S. Cl. ........................................ 711/129; 711/124

(58) Field of Classification Search .................. None
See application file for complete search history.

(56) References Cited
U.S. PATENT DOCUMENTS

| | | | |
|---|---|---|---|
| 6,223,256 B1 * | 4/2001 | Gaither | 711/134 |
| 6,243,791 B1 * | 6/2001 | Vondran, Jr. | 711/120 |
| 6,349,363 B2 * | 2/2002 | Cai et al. | 711/129 |
| 6,356,996 B1 * | 3/2002 | Adams | 712/226 |
| 6,421,761 B1 * | 7/2002 | Arimilli et al. | 711/128 |
| 6,434,672 B1 * | 8/2002 | Gaither | 711/130 |

* cited by examiner

*Primary Examiner*—Sheng-Jen Tsai
*Assistant Examiner*—Kaushikkumar Patel
(74) *Attorney, Agent, or Firm*—Blakely, Sokoloff, Taylor & Zafman LLP

(57) ABSTRACT

A method and apparatus for dedicating cache entries to certain streams for performance optimization are disclosed. The method according to the present techniques comprises partitioning a cache array into one or more special-purpose entries and one or more general-purpose entries, wherein special-purpose entries are only allocated for one or more streams having a particular stream ID.

25 Claims, 4 Drawing Sheets

METHOD AND APPARATUS FOR DEDICATING CACHE ENTRIES TO CERTAIN STREAMS FOR PERFORMANCE OPTIMIZATION

FIELD OF THE INVENTION

The present invention relates to the field of computer systems. In particular, the present invention relates to a method and apparatus for dedicating cache entries to certain streams for performance optimization.

BACKGROUND OF THE INVENTION

Caches are commonly used to temporarily store values that might be repeatedly accessed by a processor, in order to speed up processing by avoiding the longer step of loading the values from main memory such as random access memory (RAM).

An exemplary cache line (block) includes an address-tag field, a state-bit field, an inclusivity-bit field, and a value field for storing the actual instruction or data. The state-bit field and inclusivity-bit field are used to maintain cache coherency in a multiprocessor computer system. The address tag is a subset of the full address of the corresponding memory block. A compare match of an incoming effective address with one of the tags within the address-tag field indicates a cache "hit." The collection of all of the address tags in a cache (and sometimes the state-bit and inclusivity-bit fields) is referred to as a directory, and the collection of all of the value fields is the cache entry array.

When all of the blocks in a set for a given cache are full and that cache receives a request, with a different tag address, whether a "read" or "write," to a memory location that maps into the full set, the cache must "evict" one of the blocks currently in the set. The cache chooses a block to be evicted by one of a number of means known to those skilled in the art (least recently used (LRU), random, pseudo-LRU, etc.).

A general-purpose cache receives memory requests from various entities including input/output (I/O) devices, a central processing unit (CPU), graphics processors and similar devices. The CPU initiates the heaviest access to and from system memory (and inherently the cache). Thus, the CPU's requests have relatively high bandwidth requirements and are often latency sensitive. Graphics processor requests may occur infrequently compared to CPU request, however graphics request may be equally sensitive to latency. General-purpose caches fail to account for these inherent differences in requests.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

Figure 1:
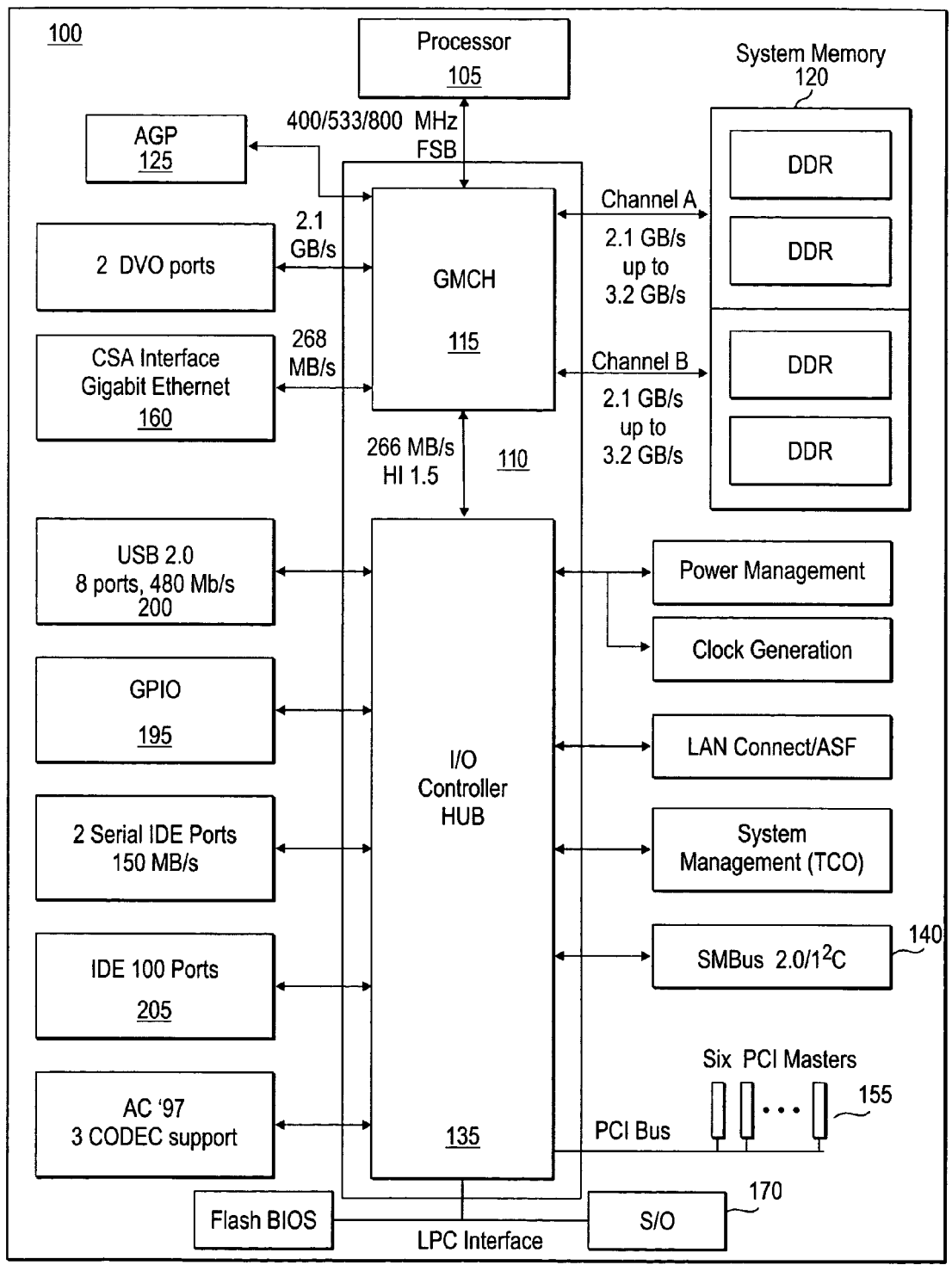
FIG. 1 illustrates a block diagram of an exemplary computer system utilizing the present method and apparatus, according to one embodiment of the present invention.

A method and apparatus for dedicating cache entries to certain streams for performance optimization are disclosed. The method according to the present techniques comprises partitioning a cache array into one or more special-purpose entries and one or more general-purpose entries, wherein special-purpose entries are only allocated for one or more streams having a particular stream ID.

In the following description, for purposes of explanation, specific nomenclature is set forth to provide a thorough understanding of the present invention. However, it will be apparent to one skilled in the art that these specific details are not required in order to practice the present invention. For example, the present invention has been described with reference to documentary data. However, the same techniques can easily be applied to other types of data such as voice and video.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a block diagram of an exemplary computer system 100 utilizing the present method and apparatus, according to one embodiment of the present invention. Computer system includes a processor 105. Chipset 110 provides system 100 with memory and I/O functions. More particularly, chipset 110 includes a Graphics and Memory Controller Hub (GMCH) 115. GMCH 115 acts as a host controller that communicates with processor 105 and further acts as a controller for main memory 120. GMCH 115 also provides an interface to Advanced Graphics Port (AGP) controller 125 which is coupled thereto. Chipset 110 further includes an I/O Controller Hub (ICH) 135 which performs numerous I/O functions. ICH 135 is coupled to a System Management Bus (SM Bus) 140.

ICH 135 is coupled to a Peripheral Component Interconnect (PCI) bus 155. A super I/O ("SID") controller 170 is coupled to ICH 135 to provide connectivity to input devices such as a keyboard and mouse 175. A General-purpose I/O (GPIO) bus 195 is coupled to ICH 135. USB ports 200 are coupled to ICH 135 as shown. USB devices such as printers, scanners, joysticks, etc. can be added to the system configuration on this bus. An integrated drive electronics (IDE) bus 205 is coupled to ICH 135 to connect IDE drives 210 to the computer system. Logically, ICH 135 appears as multiple PCI devices within a single physical component.

Figure 2:
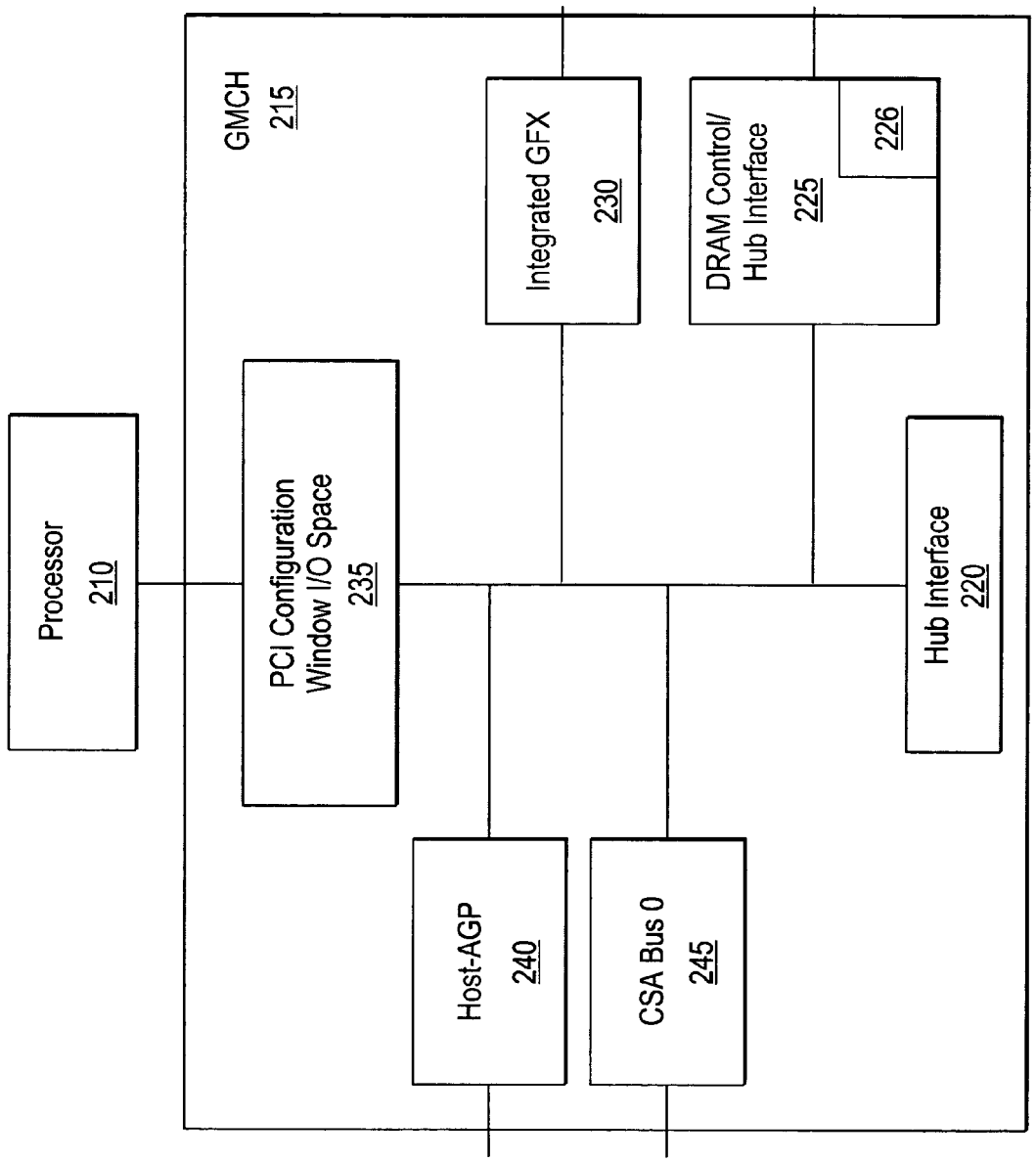
FIG. 2 illustrates a block diagram of an exemplary graphics memory controller hub utilizing the present method and apparatus, according to one embodiment of the present invention.

FIG. 2 illustrates a block diagram of an exemplary graphics memory controller hub with processor that utilizes the present method and apparatus, according to one embodiment of the present invention. GMCH 215 is a graphics memory controller hub, such as GMCH 115. GMCH 215 includes a hub interface 220 for interconnecting GMCH 215 with an I/O controller hub, such as ICH 135. Communication streaming architecture (CSA) bus 245 connects to an ethernet controller such as gigabit ethernet controller 160. Peripheral component interconnect (PCI) configuration window I/O space 235 is a combined interface and buffer for processor 210. A host-to-AGP bridge 240 provides access to an AGP controller, such as AGP controller 125. An integrated graphics controller 230 receives requests from processor 210 and an external graphics engine (not shown) to generate graphics. Also included in GMCH 215 is a DRAM controller 225 that allows access to system memory such as system memory 120. Included in DRAM controller 225 is a cache 226. DRAM controller 225 dedicates cache entries to certain streams for performance optimization.

GMCH 215 provides high performance graphics capabilities for 3D applications and high-resolution video graphics. As a configuration example, processor 210 can be a Pentium 4® processor, manufactured by Intel Corporation with an 800 MHz front side bus (FSB) and an AGP 8× graphics engine connected to host-AGP bridge 240. The AGP graphics engine shares a portion of system memory 120 via DRAM controller 225. Stored in system memory 120 is graphics data, such as geometry data, advanced textures, frame buffer and other graphics related data. As users of computer system 100 interact with graphics objects, processor 210 or a graphics engine quickly accesses the system memory 120, transfers the geometry data to its local memory and starts the computation for creating new geometry data. The new geometry data is then placed back into system memory 120 for future access. Additionally, the AGP graphics engine uses a portion of system memory 120 as its frame buffer memory for high resolution video editing and playback. Taking a closer look at this example, it is important to consider cache 226. For every memory access requested by the AGP engine or processor 210, cache 226 will see if that data is already stored therein, before retrieving data from memory 120. Additionally, if processor 210 or the AGP engine requests access to data stored in memory 120, cache 226 will also check if the requested data is already stored therein.

Traditional caches do not distinguish processor requests from graphics engine requests. As stated above, processor requests have relatively high bandwidth and are often latency sensitive. Graphics engine requests are generally low-bandwidth (low-frequency, and periodic), but are also latency sensitive. With a traditional n-way associative cache, elements of an associative set are replaced based on a pre-deterministic replacement algorithm such as least-recently-used (LRU), least-recently-accessed (LRA) or similar algorithm. These algorithms do not discriminate among the various elements of an associative cache, for example, between graphics and processor requests. The present method and apparatus, particularly with regard to cache 226, set aside special-purpose elements of an associative set. The special-purpose elements (i.e., entries) have a replacement algorithm that works independently of the other entries (i.e., general-purpose entries). For example, graphics engine requests for graphics data can be characterized as special-purpose entries, and serviced by cached 226, according to a special-purpose replacement algorithm. Whereas, the processor requests for generic processing applications are characterized as general-purpose entries, and serviced by cache 226, according to the general-purpose replacement algorithm.

The benefits of the present method and system can be seen by further explanation of cache 226, in contrast to traditional caches. With traditional caches, special-purpose entries would often be replaced by general-purpose entries because special-purpose entries, (such as graphics data) occur much less frequently than general-purpose entries (such as processor data). However, the special-purpose entries, require fast response, but suffer from latency since they compete with the highly random traffic that target the general-purpose entries. Thus, cache 226 reserves special-purpose entries for special-purpose streams to solve the latency problems that occurs with traditional caches.

Figure 3:
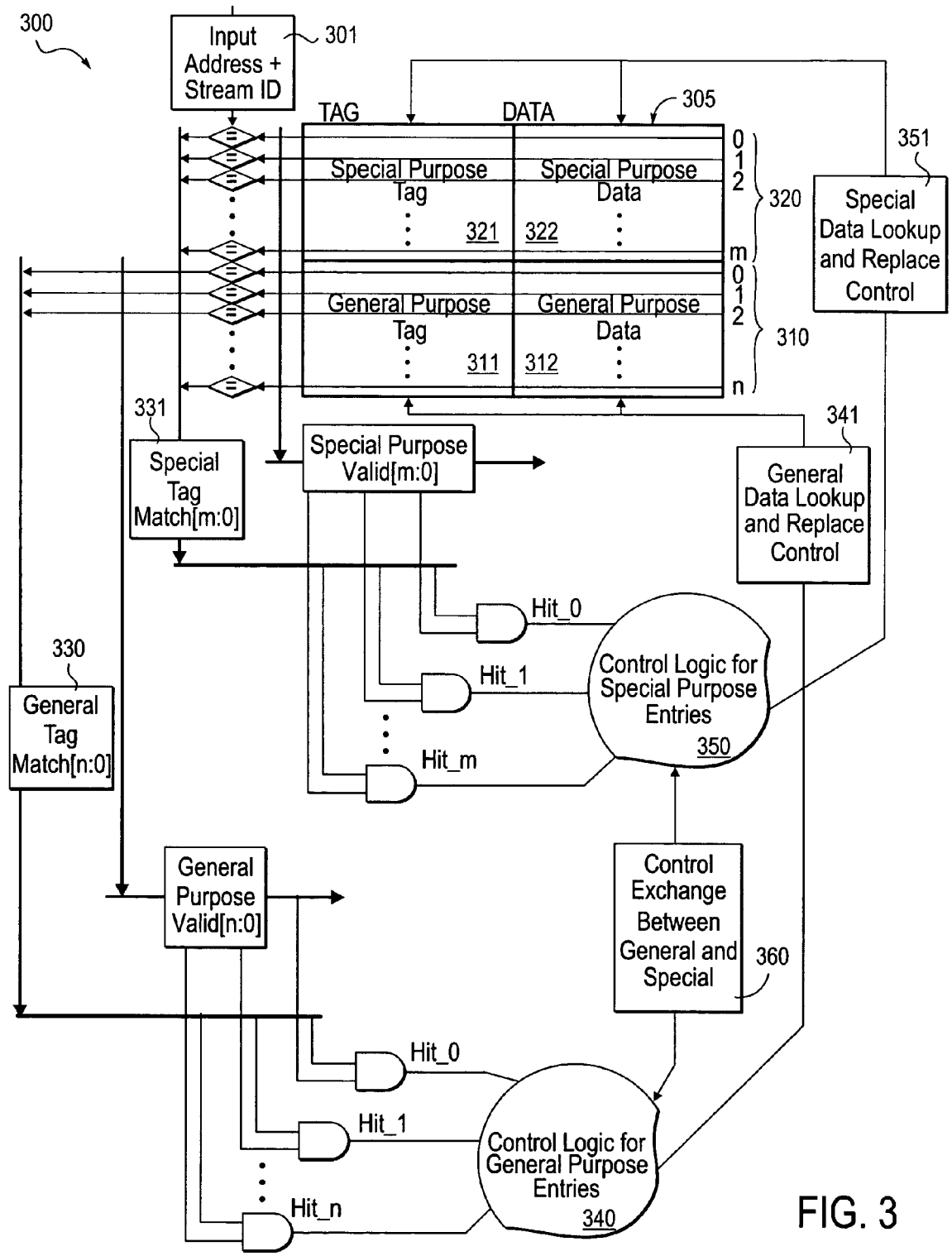
FIG. 3 illustrates a block diagram of a cache with entries dedicated to certain streams, according to one embodiment of the present invention.

FIG. 3 illustrates a block diagram of a cache that dedicates cache entries to certain streams, according to one embodiment of the present invention. Cache 300 includes storage area 305 that is split up into "n+1" general-purpose entries 310 and "m+1" special-purpose entries 320. Although storage area 305 only includes one set of special-purpose entries 320, in alternate embodiments, there may be any number of sets. Special-purpose entries 320 allocated only for certain streams that are identified by a combination of the "address" and "stream ID" 301. If access requests do not belong to a stream ID designated for the special-purpose entry 320, then the general-purpose entries 310 service the requests. Special-purpose tag field 321 and general-purpose tag field 311 identify each saved block uniquely. Thus, the tag field of an input address is compared with the tag fields 311 and 321, in order to locate the relevant block.

Each one of the special-purpose sets 320 and general-purpose sets 310 have control logic 350 and 340, respectively. Cache 300 also allows for control messaging exchange between special-purpose control logic 350 and general-purpose control logic 340. Control logic 340 and 350 may include logic to handle "cross-access" scenarios where, for example, an address with a general-purpose stream ID may already exist in one of the special-purpose sets 320 and vice-versa (i.e., when an address with a special-purpose stream ID already exists in one of the general-purpose sets 310).

Special-purpose control logic 350 provides special data lookup and replace control signals 351. Similarly, general-purpose control logic 340 provides general data lookup and replace control signals 341. Thus, replacement algorithms, whether LRU, or other similar algorithms can be implemented using control signals 341 and 351.

Figure 4:
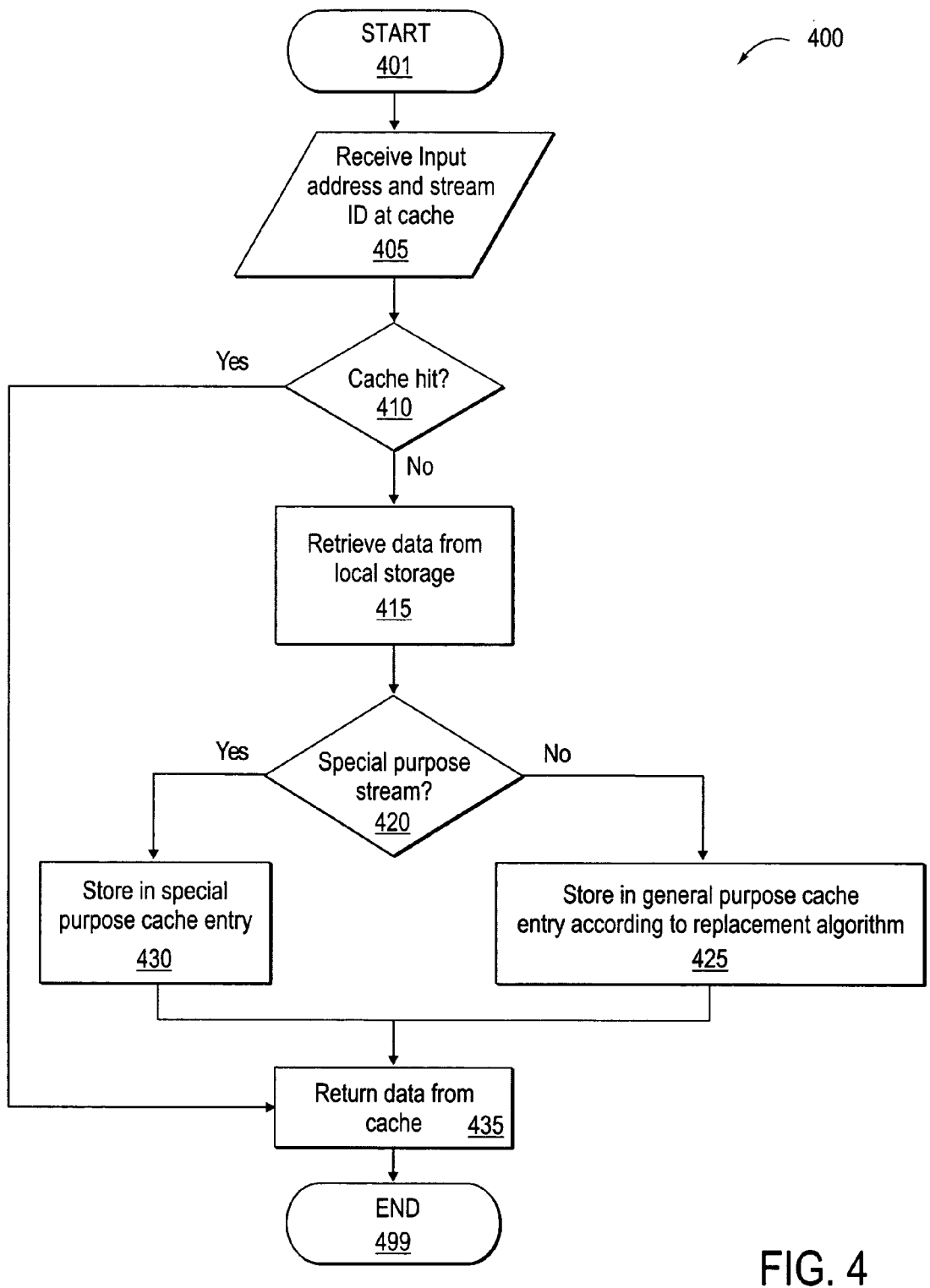
FIG. 4 illustrates a flow diagram of an exemplary process of dedicating cache entries to certain streams, according to one embodiment of the present invention.

Having provided a description of the hardware of cache 300, a functional description is provided by example. FIG. 4 illustrates a flow diagram of an exemplary process of dedicating cache entries to certain streams, according to one embodiment of the present invention. Suppose an AGP engine requests geometry data from system memory 120. DRAM controller 225 receives the input address and stream ID 301, and provides them to cache 300. (processing block 405) If the input address matches any entry within cache 300 (decision block 410), a cache "hit" occurs and the requested geometry data is returned to the AGP engine from cache 300 via Host-AGP bridge 240. If a cache "miss" occurs, the geometry data is fetched from system memory 120. Cache 300, using control logic for special-purpose entries 350, determines if the stream ID indicate that the geometry data belongs to a special-purpose stream (decision block 420).

If the data is determined to be special-purpose, based on the stream ID and/or input address, then control logic 350 generates special data lookup and replace control signals 351 to store the data in the special-purpose cache entries 320 (processing block 430). If the data is not determined to be a special-purpose, then control logic 340 generates general-purpose data lookup and replace control signals 341 to store the data in the general-purpose cache entries 310 (processing block 425). The requested geometry data is then returned to the AGP engine from cache 300 via Host-AGP bridge 240. (processing block 435). The process completes, once all the requested data is returned. (processing block 499).

In the example and description above, the process has been provided without reference to a specific replacement algorithm. In one embodiment, the general-purpose control logic 340 implements an LRU algorithm and special-purpose control logic 350 controls four sets of special-purpose entries, where each set targets an independent graphics stream. By splitting up the cache into various "mostly" independent sets, the replacement algorithm for each set can be tuned to address the specific characteristics of the stream that targets that set.

Also in the description and example above, graphics streams have generally been identified as special-purpose streams. More specifically, certain graphics streams particularly benefit from the present system and method. Display streams are low bandwidth, isochronous streams that are very latency sensitive. Any unwarranted cache misses could result in flicker on the screen. Display streams are examples of streams that are very well behaved in how they access the memory. Display streams will complete the accesses in a page of memory and then move on to the next one. There will be a long time before the stream comes back to the page that it had used earlier. Therefore, this stream works very well with just one cache entry that is dedicated for the stream (each entry of the cache has 32 bits with each bit covering a page of memory). In the absence of a special dedicated entry, this stream may be thrashed by other high bandwidth, random access streams. Cursor streams are another example of low bandwidth, isochronous streams that work very well with just one entry in the cache.

A method and apparatus for dedicating cache entries to certain streams for performance optimization are disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

We claim:

1. A method, comprising:
partitioning a cache array into one or more special-purpose entries and one or more general-purpose entries, wherein special-purpose entries are only allocated for one or more streams having a particular stream ID and the particular stream ID is stored outside the cache array, wherein the special-purpose entries to use a first cache replacement algorithm and the one or more general-purpose entries to use a second cache replacement algorithm, wherein the first and second cache replacement algorithms are different;
storing data from the one or more streams in the one or more special-purpose entries when the particular stream ID and a particular input address match a predetermined stream ID and a predetermined input address;
storing data from the one or more streams in the one or more general-purpose entries when the particular stream ID and the particular input address do not match the predetermined stream ID and the predetermined input address;
determining if a cross-access scenario exists between at least one of the one or more special purpose entries and at least one of the one or more general purpose entries; and
if the cross-access scenario exists, permitting cross-access of data between the at least one of the one or more special-purpose entries and the at least one of the one or more general-purpose entries that relate to the cross-access scenario.

2. The method as claimed in claim 1, further comprising allocating the one or more special-purpose entries based on the particular stream ID and the particular input address.

3. The method as claimed in claim 2, further comprising determining when the particular stream ID and the particular input address match the predetermined stream ID and the predetermined input address using special-purpose control logic.

4. The method as claimed in claim 3, wherein the one or more streams are special-purpose streams including graphics streams.

5. A device comprising:
a cache memory array partitioned into one or more special-purpose entries and one or more general-purpose entries, wherein special-purpose entries are only allocated for one or more streams having a particular stream ID, wherein the particular stream ID is stored outside the cache array;
control logic to determine if a cross-access scenario exists between at least one of the one or more special purpose entries and at least one of the one or more general purpose entries, wherein the control logic comprises:

special-purpose control logic to store data from the one or more streams in the one or more special-purpose entries when the particular stream ID and a particular input address match a predetermined stream ID and a predetermined input address, the special-purpose control logic to implement a first cache replacement algorithm for the one or more special-purpose entries, and general-purpose control logic to store data from the one or more streams in the one or more general-purpose entries when the particular stream ID and the particular input address do not match the predetermined stream ID and the predetermined input address, the general-purpose control logic to implement a second cache replacement algorithm for the one or more general-purpose entries, wherein the first and second cache replacement algorithms are different; and if the cross-access scenario exists, the control logic to permit cross-access of data between the at least one of the one or more special-purpose entries and the at least one of the one or more general-purpose entries that relate to the cross-access scenario.

6. The device as claimed in claim 5 further comprising:
the control logic to allocate the one or more special-purpose entries based on the particular stream ID and the particular input address.

7. The device as claimed in claim 6, wherein the special-purpose control logic determines when the particular stream ID and the particular input address match the predetermined stream ID and the predetermined input address.

8. The device of claim 7, further comprising a DRAM controller integrated with the cache memory array.

9. The device of claim 8, further comprising an integrated graphics controller, a host AGP controller, and an I/O hub interface coupled to the DRAM controller.

10. A computer-readable medium having stored thereon a plurality of instructions, the plurality of instructions when executed by a computer, cause the computer to perform the method comprising:

partitioning a cache array into one or more special-purpose entries and one or more general-purpose entries, wherein special-purpose entries are only allocated for one or more streams having a particular stream ID and the particular stream ID is stored outside the cache array, wherein the special-purpose entries to use a first cache replacement algorithm and the one or more general-purpose entries to use a second cache replacement algorithm, wherein the first and second cache replacement algorithms are different;

storing data from the one or more streams in the one or more special-purpose entries when the particular stream ID and the particular input address match a predetermined stream ID and a predetermined input address;

storing data from the one or more streams in the one or more general-purpose entries when the particular stream ID and the particular input address do not match the predetermined stream ID and the predetermined input address;

determining if a cross-access scenario exists between at least one of the one or more special purpose entries and at least one of the one or more general purpose entries; and if the cross-access scenario exists, permitting cross-access of data between the at least one of the one or more special-purpose entries and the at least one of the one or more general-purpose entries that relate to the cross-access scenario.

11. The computer-readable medium of claim 10 having stored thereon additional instructions, the additional instructions when executed by a computer, cause the computer to further perform the method of allocating the one or more special-purpose entries based on the particular stream ID and the particular input address.

12. The computer-readable medium of claim 11 having stored thereon additional instructions, the additional instructions when executed by a computer, cause the computer to further perform the method of determining when the particular stream ID and the particular input address match the predetermined stream ID and the predetermined input address using special-purpose control logic.

13. The computer-readable medium of claim 12, wherein the one or more streams are special-purpose streams including graphics streams.

14. A system, comprising:
means for partitioning a cache array into one or more special-purpose entries and one or more general-purpose entries, wherein the special-purpose entries are only allocated for one or more streams having a particular stream ID and the particular stream ID is stored outside the cache array, wherein the special-purpose entries to use a first cache replacement algorithm and the one or more general-purpose entries to use a second cache replacement algorithm, wherein the first and second cache replacement algorithms are different;

means for storing data from the one or more streams in the one or more special-purpose entries when the particular stream ID and the particular input address match a predetermined stream ID and a predetermined input address;

means for storing data from the one or more streams in the one or more general-purpose entries when the particular stream ID and the particular input address do not match the predetermined stream ID and the predetermined input address;

means for determining if a cross-access scenario exists between at least one of the one or more special purpose entries and at least one of the one or more general purpose entries; and if the cross-access scenario exists, means for permitting cross-access of data between the at least one of the one or more special-purpose entries and the at least one of the one or more general-purpose entries that relate to the cross-access scenario.

15. The system as claimed in claim 14, further comprising means for allocating the one or more special-purpose entries based on the particular stream ID and the particular stream address.

16. The system as claimed in claim 15, further comprising means for determining when the particular stream ID and the particular input address match the predetermined stream ID and the predetermined input address using special-purpose control logic.

17. The system as claimed in claim 16, wherein the one or more streams are special-purpose streams including graphics streams.

18. A system, comprising:
a system memory controller, comprising a cache memory array partitioned into one or more special-purpose entries and one or more general-purpose entries, wherein special-purpose entries are only allocated for one or more streams having a particular stream ID and the particular stream ID is stored outside the cache array, wherein the special-purpose entries to use a first cache replacement algorithm and the one or more general-purpose entries to use a second cache replacement algorithm, wherein the first and second cache replacement algorithms are different;

control logic, coupled to the cache memory array, the control logic to determine if a cross-access scenario exists between at least one of the one or more special purpose entries and at least one of the one or more general purpose entries;

if the cross-access scenario exists, the control logic to permit cross-access of data between the at least one of the one or more special-purpose entries and the at least one of the one or more general-purpose entries that relate to the cross-access scenario;

wherein the control logic further comprises: special-purpose control logic to store data from the one or more streams in the one or more special-purpose entries when the particular stream ID and the particular input address match a predetermined stream ID and a predetermined input address;

general-purpose control logic to store data from the one or more streams in the one or more general-purpose entries when the particular stream ID and the particular input address do not match the predetermined stream ID and the predetermined input address: and system memory connected to the system memory controller.

19. The system as claimed in claim 18, further comprising one or more interfaces connected to the system memory controller, including an I/O hub interface connected to a bus, a processor interface; and a host AGP controller connected to the system memory controller via the bus; wherein the cache array receives the cache operation requesting data via the one or more interfaces, and returns a cache hit in response to the cache operation, wherein the cache has a pending fetch for the data in response to a prior cache operation requesting the data.

20. The system as claimed in claim 19, wherein the processor interface connects to a processor of a plurality of processors, the plurality of processors including a 16 bit processor and a 64 bit processor.

21. The system as claimed in claim 20, wherein the special-purpose control logic determines when the particular stream ID and the particular input address match the predetermined stream ID and the predetermined input address.

22. A device, comprising:

a hub interface to use with a 64-bit processing architecture;

a cache memory array partitioned into one or more special-purpose entries and one or more general-purpose entries; and control logic to allocate the one or more special-purpose entries based on a particular stream ID and a particular input address, wherein the particular stream ID is stored outside the cache array, wherein the special-purpose entries to use a first cache replacement algorithm and the one or more general-purpose entries to use a second cache replacement algorithm, wherein the first and second cache replacement algorithms are different;

determine if a cross-access scenario exists between at least one of the one or more special purpose entries and at least one of the one or more general purpose entries;

if the cross-access scenario exists, permit cross-access of data between the at least one of the one or more special-purpose entries and the at least one of the one or more general-purpose entries that relate to the cross-access scenario;

wherein the control logic further comprises:

special-purpose control logic to store data from the one or more streams in the one or more special-purpose entries when the particular stream ID and the particular input address match a predetermined stream ID and a predetermined input address; and general-purpose control logic to store data from the one or more streams in the one or more general-purpose entries when the particular stream ID and the particular input address do not match the predetermined stream ID and the predetermined input address.

23. The device as claimed in claim 22, wherein the special-purpose control logic determines when the particular stream ID and the particular input address match the predetermined stream ID and the predetermined input address.

24. The device of claim 23, further comprising a DRAM controller integrated with the cache memory array.

25. The device of claim 23, further comprising an integrated graphics controller, and a host AGP controller.

* * * * *